No. 840,898. PATENTED JAN. 8, 1907.
G. E. BARRETT.
CULTIVATOR.
APPLICATION FILED MAR. 7, 1906.
3 SHEETS—SHEET 1.
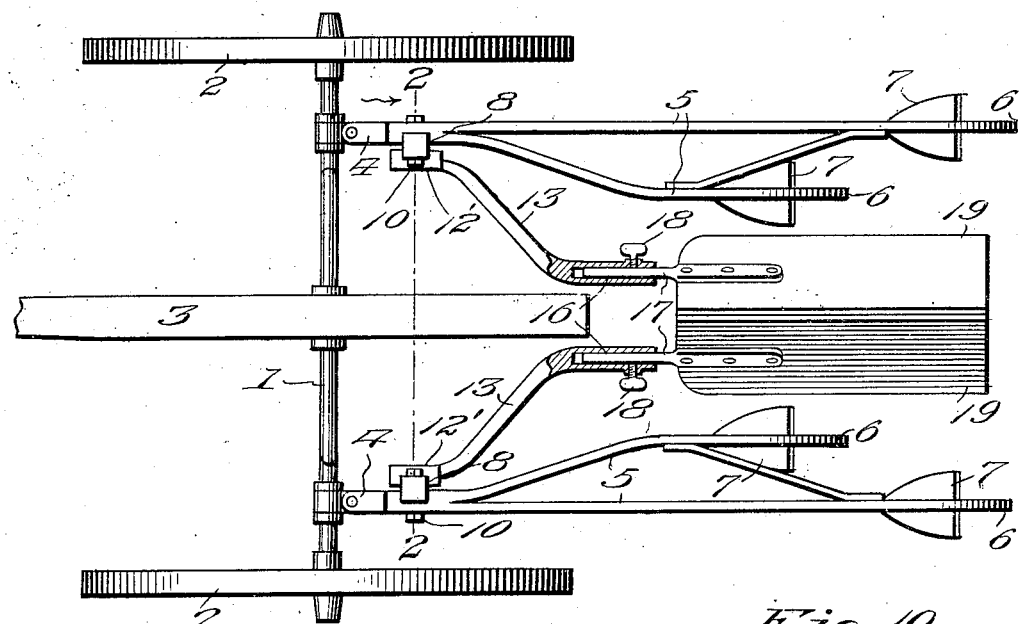
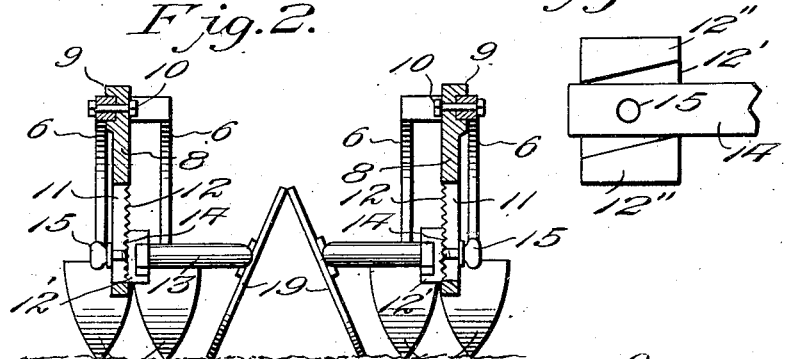
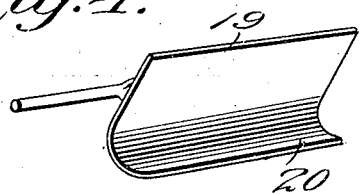
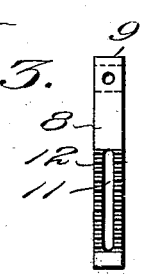
WITNESSES:
Edwin F. McKee
P. M. Smith
INVENTOR
George E. Barrett
BY Victor J. Evans
Attorney No. 840,898. PATENTED JAN. 8, 1907.
G. E. BARRETT.
CULTIVATOR.
APPLICATION FILED MAR. 7, 1906.
3 SHEETS—SHEET 2.
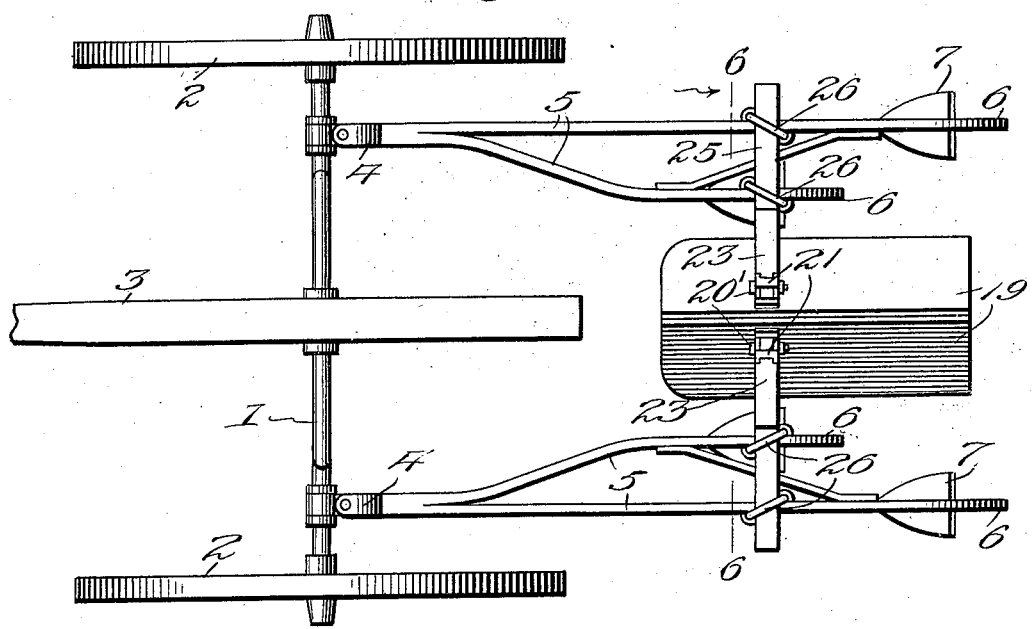
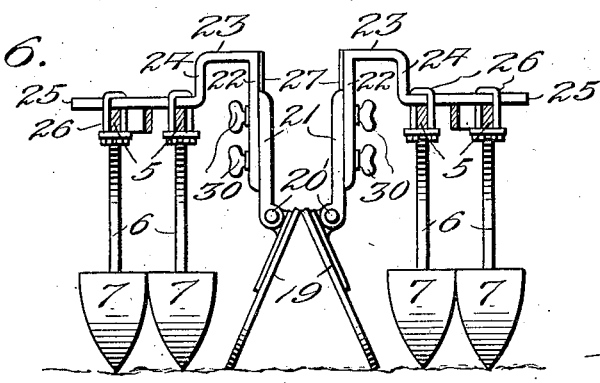
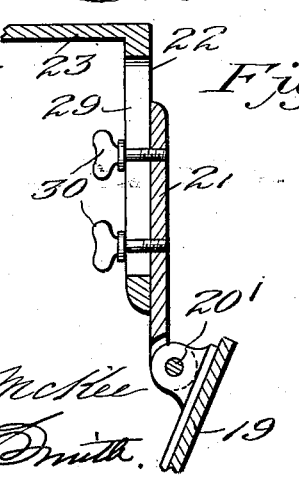
INVENTOR
George E. Barrett
By Victor J. Evans
Attorney
WITNESSES:

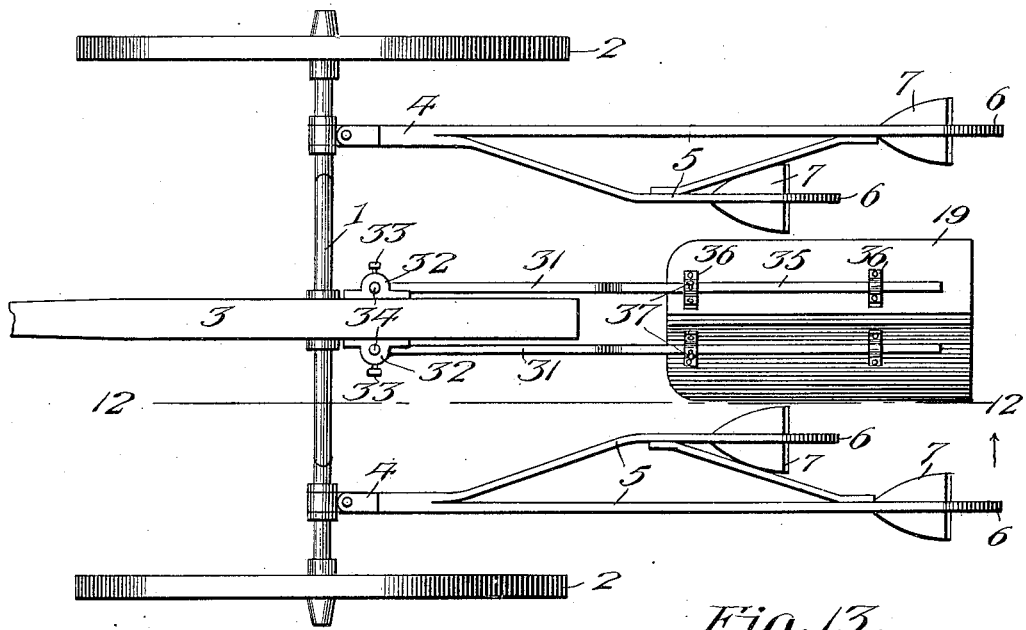

UNITED STATES PATENT OFFICE.

GEORGE EUGENE BARRETT, OF DULUTH, MINNESOTA, ASSIGNOR OF ONE-HALF TO JOHN Z. MILLER, OF SUPERIOR, WISCONSIN.

CULTIVATOR.

No. 840,898.     Specification of Letters Patent.     Patented Jan. 8, 1907.

Application filed March 7, 1906. Serial No. 304,735.

*To all whom it may concern:*

Be it known that I, GEORGE EUGENE BARRETT, a citizen of the United States, residing at Duluth, in the county of St. Louis and State of Minnesota, have invented new and useful Improvements in Cultivators, of which the following is a specification.

This invention relates to cultivators, the object of the invention being to provide a shield embodying separate and independently-adjustable sections or members, the shield as a whole being adjustable up and down to suit plants of different sizes and also being adapted to protect young and tender plants from being injured by the soil thrown up by the shovels of the cultivator and at the same time provide for a thorough and effective cultivation of the plants.

A further object of the invention is to make the shield as a whole adjustable in height, so that the shield may be raised as the plants increase in size.

A further object of the invention is to provide a novel form of shield member especially adapted for use in connection with plants having spreading leaves which lie close to or upon the ground, whereby the leaves are raised to allow the soil to be thrown close up to the stalks of the plants and beneath the leaves thereof without danger of injuring the plants.

With the above and other objects in view, the nature of which will more fully appear as the description proceeds, the invention consists in the novel construction, combination, and arrangement of parts hereinafter more fully described, illustrated, and claimed.

In the accompanying drawings, Figure 1 is a plan view of a cultivator embodying the present invention, being shown partly in section. Fig. 2 is a cross-sectional view thereof on the line 2 2 of Fig. 1. Fig. 3 is a detail elevation of one of the hangers. Fig. 4 is a detail perspective view of one of the shield members. Fig. 5 is a plan view similar to Fig. 1, showing modified means for supporting and adjusting the shield. Fig. 6 is a cross-section on the line 6 6 of Fig. 5. Fig. 7 is an enlarged detail vertical section showing the relation between one of the shield members, a hanger, and the arm which connects the shield to the hanger. Fig. 8 is a side elevation of the hanger and shield-supporting arm or carrier. Fig. 9 is an enlarged cross-section through the arrangement shown in Figs. 6 and 8. Fig. 10 is a detail elevation of one of the adjusting-blocks for the shield-carrier arms, showing also a portion of one of the arms. Fig. 11 is a plan view of the cultivator, showing a modified arrangement of carrier and adjusting means therefor. Fig. 12 is a sectional elevation of the same. Fig. 13 is a sectional plan view of one of the guides or sockets.

Referring to the drawings, 1 designates the main axle, provided with the carrying-wheels 2 and connected with the pole or tongue 3, while 4 designates a pair of beams connected to the axle 1 and extending rearwardly therefrom in parallel relation to each other.

In carrying out the present invention each of the beams 4 is preferably bifurcated to form substantially parallel branches 5, each of which is extended downward to form a standard 6, to the lower end of which is connected a shovel 7. Any desired number of shovels 7 may be provided.

Under the arrangement shown in Fig. 1 a vertically-disposed hanger 8 is connected to the inner side of each beam 4, said hanger consisting of a bar provided with a grooved seat 9, in which the beam 4 is received, said parts being firmly connected by a bolt 10 or its equivalent. The lower end of the hanger 8 is slotted longitudinally, as shown at 11, and also has its inner face toothed or serrated, as shown at 12, said slot and toothed face providing for the adjustment up and down thereon of a flanged block 12', to which is pivotally connected a shield-member arm or carrier 13. The block 12' is secured to the serrated face 12 of the hanger and is itself serrated or toothed to engage therewith, as shown at 14. A fastening-screw 15 extends through the slot in the hanger 11 and engages the block 12', as shown in Fig. 2, thus providing for adjusting the block and carrier 13 up and down on the hanger to raise and lower the shield member carried thereby. The block 12' is provided with flanges or inclined shoulders 12", which allow the carrier 13 to tilt upward, but prevent it from falling below a horizontal position.

The carriers 13 are offset inwardly, as shown in Fig. 1, and the rear end portions thereof are extended backward substantially parallel to each other and provided with sockets 16, in which are received the forwardly-extending shanks 17 of the shield members, said shanks being secured in place by means of binding-screws 18, which permit the shanks 17 to be adjusted fore and aft and also to be turned on their longitudinal axes for adjusting the angles of the shield members, as will be readily understood by an inspection of Figs. 1 and 2.

The shield is composed of two members 19, which may be termed shield "plates" or "boards," the said shield members being adapted to be normally disposed at an angle to each other like an inverted V, as best illustrated in Fig. 2, with their upper edges touching or in close proximity to each other, their lower edges moving in close proximity to or in actual contact with the surface of the ground.

Under the arrangement shown in Figs. 1 and 2 the shield members 19 are connected rigidly to the shanks 17, while said shanks are adjustable both fore and aft and axially within the socketed rear ends of the carriers 13. This provides for adjusting the shield members 19 to any desired angle necessary to properly cover and protect the plants during the progress of the machine across the field. It will also be seen that each shield member is adjustable independently of the other and that both of the shield members are adjustable up and down to accommodate them to the plants as they increase in size. The V-shaped relation of the shield members provides for dividing the soil thrown by the shovels and forms a complete shade over the plants, causing the soil to fall clear of the plants without danger of the same passing backward over the rear end of the shield and falling upon the plants to the injury of the latter.

Where the plants have spreading leaves lying upon the ground, I employ a special form of shield 19, as shown in Fig. 4, the lower portion of said shield being bent inward to form an inwardly-extending flange 20, which is adapted to ride beneath the outspreading leaves of the plants, picking them up and allowing the loose soil displaced by the shovels to crowd inward beneath the leaves and up close to the stalks of the plants.

In Figs. 5 to 9, inclusive, I have illustrated a slight modification in the manner of mounting the shield members, involving, however, the same principle. In said figures it will be seen that the shield members 19 are pivotally connected at 20' to the carriers 21, which under said modified arrangement are in the form of upstanding arms or slides, which overlap and slide upon the depending portions 22 of the hangers. Each of said hangers is extended laterally, as shown at 23, and then offset downwardly, as at 24, and then extended laterally outward to form a shank 25, which extends across the top edges of the branches 5 of the beams 4, the said shanks 25 being adjustably secured to the branches 5 by means of clips 26, as best illustrated in Figs. 5 and 6. The portions 22 of the hangers are provided on their inner faces with longitudinal guide-ribs 27, while the carriers or arms 21 are grooved upon their corresponding faces, as shown at 28, to receive the ribs 27, the ribs and grooves providing for maintaining the parts 21 and 22 in vertical alinement with each other. The depending portions 22 of the hangers are also slotted longitudinally, as shown at 29, and binding-screws 30 pass through said slots and engage the carriers 21, so as to provide for adjusting said carriers up and down and correspondingly raising and lowering the shield members 19.

From the foregoing description it will be seen that the shield members 19 may be adjusted independently upward and downward on the hangers and that the hangers may be adjusted fore and aft on the branches 5 of the beams or adjusted laterally with respect to said beams so as to provide the necessary distance between the shield members.

By reason of the connection between the arms 14 and the adjustable blocks 12' the shields are adapted to automatically rise and fall when passing over obstructions, while at the same time the arms are prevented from falling below a substantially horizontal position.

Under the arrangement shown in Figs. 11, 12, and 13 each of the carriers (indicated at 31) is made in one piece with the hanger, the carrier 31 having the forward end portion thereof bent upward to extend vertically through a bearing or socket 32, secured to the machine-frame and provided with a binding-screw 33, by means of which the vertical portion 34 of the carrier may be held at any desired adjustment. The rear end of each carrier is bent to extend horizontally, as shown at 35, where it passes through guides or sockets 36, secured to the outer face of one of the shield members 19, and one of said guides or sockets is provided with a set-screw 37, which enables the shield member 19 to be adjusted back and forth on the horizontal portion 35 of the carrier and to be fastened when brought to the desired position. By the means just described the shield members may be adjusted back and forth and also up and down to bring the same in the desired relation to the plants and to the plows or shovels, so that said shield members will effectually protect the plants as the machine is drawn along the field.

I claim—

1. The combination with a cultivator, of a plant-shield embodying angularly-disposed members, and shield-carriers movable toward and away from each other in a direction transverse to the path of movement of the cultivator to vary the distance between the shield members.

2. The combination with a cultivator, of a plant-shield comprising angularly-disposed members adjustable relatively to each other and each having an inwardly-extending flange at the bottom thereof, substantially as described.

3. The combination with a cultivator, of a plant-shield embodying angularly-disposed members provided with shanks, and shield-carriers connected with the machine-frame and provided with sockets to receive the shanks of the shield members, said shanks being adjustably connected with the carriers.

4. The combination with a cultivator, of a plant-shield embodying angularly-disposed members having shanks, and shield-carriers adjustably connected to the machine-frame and provided with sockets in which said shanks are received, and means for adjusting said shanks to vary the relative angles of the shield members.

5. The combination with a cultivator, of a plant-shield embodying angularly-disposed members, hangers therefor connected to the cultivator-beams, blocks adjustable up and down on said hangers and provided with flanges having inclined shoulders substantially parallel to each other, and carriers for said shield members pivotally connected to said blocks and interposed between the shoulders thereof.

6. The combination with a cultivator, of a plant-shield embodying angularly-disposed members, upright hangers therefor connected to the cultivator-beams and having serrated inner surfaces, serrated blocks adjustable up and down on said hangers, and carriers for said shield members connected to said blocks and adjustable up and down therewith on the hangers.

In testimony whereof I affix my signature in presence of two witnesses.

GEORGE EUGENE BARRETT.

Witnesses:
 CHRISTENE A. SHAW,
 K. KNUDSON.